United States Patent
Raj et al.

(10) Patent No.: US 11,029,403 B2
(45) Date of Patent: Jun. 8, 2021

(54) MILLIMETER-WAVE AIRBORNE RADAR FOR 3-DIMENSIONAL IMAGING OF MOVING AND STATIONARY TARGETS

(71) Applicant: The Government of the United States of America, as represented by the Secretary of the Navy, Arlington, VA (US)

(72) Inventors: Raghu G. Raj, Fairfax, VA (US); Christopher T. Rodenbeck, Annandale, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 303 days.

(21) Appl. No.: 16/223,923

(22) Filed: Dec. 18, 2018

(65) Prior Publication Data

US 2019/0187275 A1    Jun. 20, 2019

Related U.S. Application Data (60) Provisional application No. 62/599,995, filed on Dec. 18, 2017.

(51) Int. Cl.
*G01S 13/90* (2006.01)
*G01S 7/04* (2006.01)
(Continued)

(52) U.S. Cl.
CPC ............ *G01S 13/904* (2019.05); *G01S 7/04* (2013.01); *G01S 13/9023* (2013.01);
(Continued)

(58) Field of Classification Search
CPC .... G01S 13/9023; G01S 19/13; G01S 13/867; G01S 13/90; G01S 13/92; G01S 7/4026;
(Continued)

(56) References Cited

U.S. PATENT DOCUMENTS 9,971,031 B2 * 5/2018 Liu ................... G01S 13/904
2008/0224923 A1 * 9/2008 Aprile ............... G01S 13/9029
342/25 D (Continued)

OTHER PUBLICATIONS

Lee et al, "Intensity and Phase Statistics of Multilook Polarimetric and Interferometric SAR Imagery", Sep. 1994, IEEE Transactions on Geoscience and Remote Sensing, vol. 32, No. 5, pp. 1017-1028 (Year: 1994).*

(Continued)

*Primary Examiner* — Olumide Ajibade Akonai
(74) *Attorney, Agent, or Firm* — US Naval Research Laboratory; William P. Ladd (57) ABSTRACT

Systems and method are provided for three-dimensional (3D) imaging by using Doppler and interferometric processing techniques for general planar phased arrays. Systems and methods according to embodiments of the present disclosure incorporate motion compensation techniques in a way that utilizes the full aperture of a phase array. Embodiments of the present disclosure can be applied to a variety of different radar imaging modalities, including X-band and millimeter wave (MMW) regimes.

20 Claims, 8 Drawing Sheets

(51) Int. Cl.
  *H04N 13/254*  (2018.01)
  *G01S 13/02*  (2006.01)
(52) U.S. Cl.
  CPC ....... *G01S 13/9029* (2013.01); *G01S 13/9064* (2019.05); *G01S 2013/0245* (2013.01); *H04N 13/254* (2018.05)
(58) Field of Classification Search
  CPC .... G01S 13/87; G01S 13/904; G01S 13/9064; G01S 2013/0245; G01S 13/9029; G06T 3/4053; H04N 13/254
  USPC ........................................................ 342/25 F
  See application file for complete search history.

(56) References Cited

U.S. PATENT DOCUMENTS

| | | | | |
|---|---|---|---|---|
| 2011/0285577 | A1* | 11/2011 | Sun | G01S 13/89 342/123 |
| 2013/0106651 | A1* | 5/2013 | Goldstein | G01S 13/904 342/25 F |
| 2015/0042510 | A1* | 2/2015 | Carande | G01S 13/90 342/25 C |
| 2015/0268340 | A1* | 9/2015 | Bruyere | G01S 13/9023 342/250 |
| 2018/0011187 | A1* | 1/2018 | Katayama | G01S 13/9023 |
| 2018/0031695 | A1* | 2/2018 | Carswell | G01S 13/93 |
| 2018/0059238 | A1* | 3/2018 | Stevens | G01S 13/90 |
| 2018/0088230 | A1* | 3/2018 | Hung | G01S 13/931 |

OTHER PUBLICATIONS

Mark Richards, "A Beginner's Guide to Interferometric SAR Concepts and Signal Processing", Jun. 2006, IEEE Aerospace & Electronic Systems Magazine Part 3: Tutorials, pp. 5-29 (Year: 2007).*

* cited by examiner

MILLIMETER-WAVE AIRBORNE RADAR FOR 3-DIMENSIONAL IMAGING OF MOVING AND STATIONARY TARGETS

CROSS REFERENCE TO RELATED APPLICATIONS

This application claims the benefit of U.S. Provisional Patent Application No. 62/599,995, filed on Dec. 18, 2017, which is incorporated by reference herein in its entirety.

FIELD OF THE DISCLOSURE

This disclosure relates to imaging techniques, including radar imaging techniques.

BACKGROUND

Radars use radio waves to detect objects, such as underwater objects (e.g., by determining the range, angle, and/or velocity of objects). An important application for automotive radar sensors is the ability to perform 3D imaging of moving targets. Previous imaging techniques have limited performance in the presence of noise and do not optimally utilize the structure of the phased array. Systems and methods are needed for 3D imaging that address limitations of conventional methods (e.g., by better utilizing phased arrays and performing better in the presence of noise).

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. Overview

Embodiments of the present disclosure provide systems and methods for three-dimensional (3D) imaging by using Doppler and interferometric processing techniques for general planar phased arrays. Systems and methods according to embodiments of the present disclosure incorporate motion compensation techniques in a way that utilizes the full aperture of a phase array. Embodiments of the present disclosure can be applied to a variety of different radar imaging modalities, including X-band and millimeter wave (MMW) regimes.

Embodiments of the present disclosure enable multi-phase center radar sensors to form 3D inverse synthetic aperture radar (ISAR) images of targets. Embodiments of the present disclosure exploit both the range-Doppler and phase array structure to enable interferometric processing (e.g., for height estimation) under noisy sensing conditions. Embodiments of the present disclosure address the need to form accurate representation of targets of interest when sensed from radar platforms.

An important application for automotive radar sensors is the ability to perform 3D imaging of moving targets. Embodiments of the present disclosure support 3D ISAR. Current techniques use a single-look process that has limited performance in the presence of noise and does not optimally utilize the structure of the phased array. Embodiments of the present disclosure provide a multi-look process that performs better under noisy measurements and provides accurate estimation of heights for each of the identified scattering centers under sensor noise. Embodiments of the present disclosure provide systems and methods for performing 3D ISAR imaging for multi-phase center radar systems under noisy conditions.

Figure 1A:
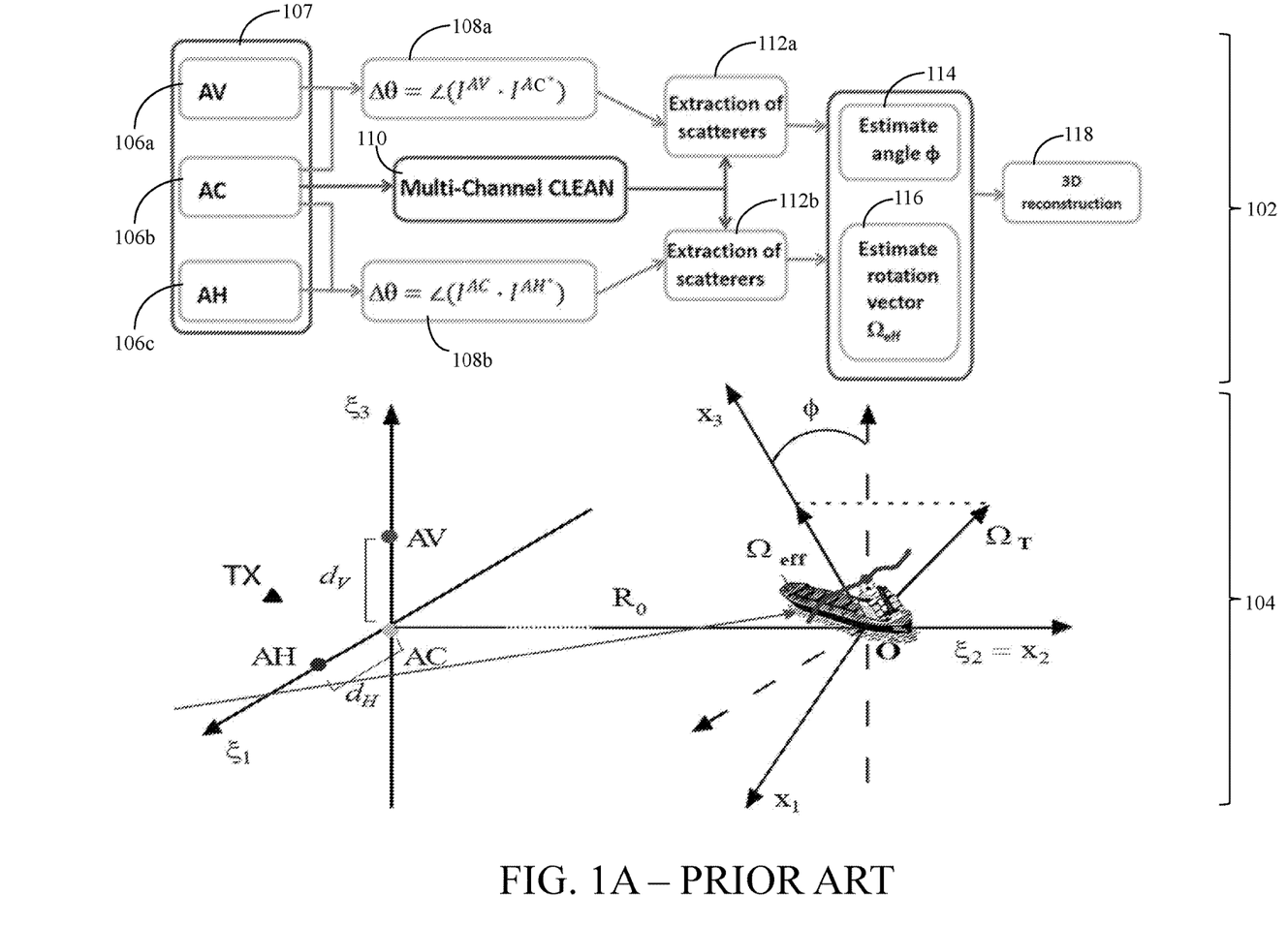
FIG. 1A shows a diagram illustrating an inverse synthetic aperture radar (ISAR) system with a single-look process and a diagram illustrating referenced variables.

FIG. 1A shows a diagram illustrating an ISAR system with a single-look process 102 and a diagram illustrating referenced variables 104. The algorithm of FIG. 1A has limited performance in the presence of noise and does not optimally utilize the structure of the phased array.

In step 107, data from sensors 106 is received. In FIG. 1, sensors 106 have a field of view and sense directional data from an object (e.g., a ship). For example, in an embodiment, sensors 106a, 106b, and 106c each sense the same scatterer, but from a different location. In an embodiment, because of the different location, there is a phase difference between data from each of sensors 106.

The phase difference $\Delta\theta$ (=$\delta\varphi_H$ or $\delta\varphi_V$) is determined from data from sensors 106 in steps 108a and 108b. In step 110, the phase difference $\Delta\theta$ (=$\delta\varphi_H$ or $\delta\varphi_V$) is cleaned out of the image so that data for the next scatterer can be found without interference from previous data. In steps 112a and 112b, data from the scatterers is extracted. In step 114, the angle $\phi$ (e.g., the angle of the effective rotation vector of the object from the Z axis) is estimated. In step 116, the rotation vector (e.g., a vector that captures the rotation of the object in the 3D space) $\Omega_{eff}$ is estimated. In step 118, a 3D reconstruction is made.

Figure 1B:
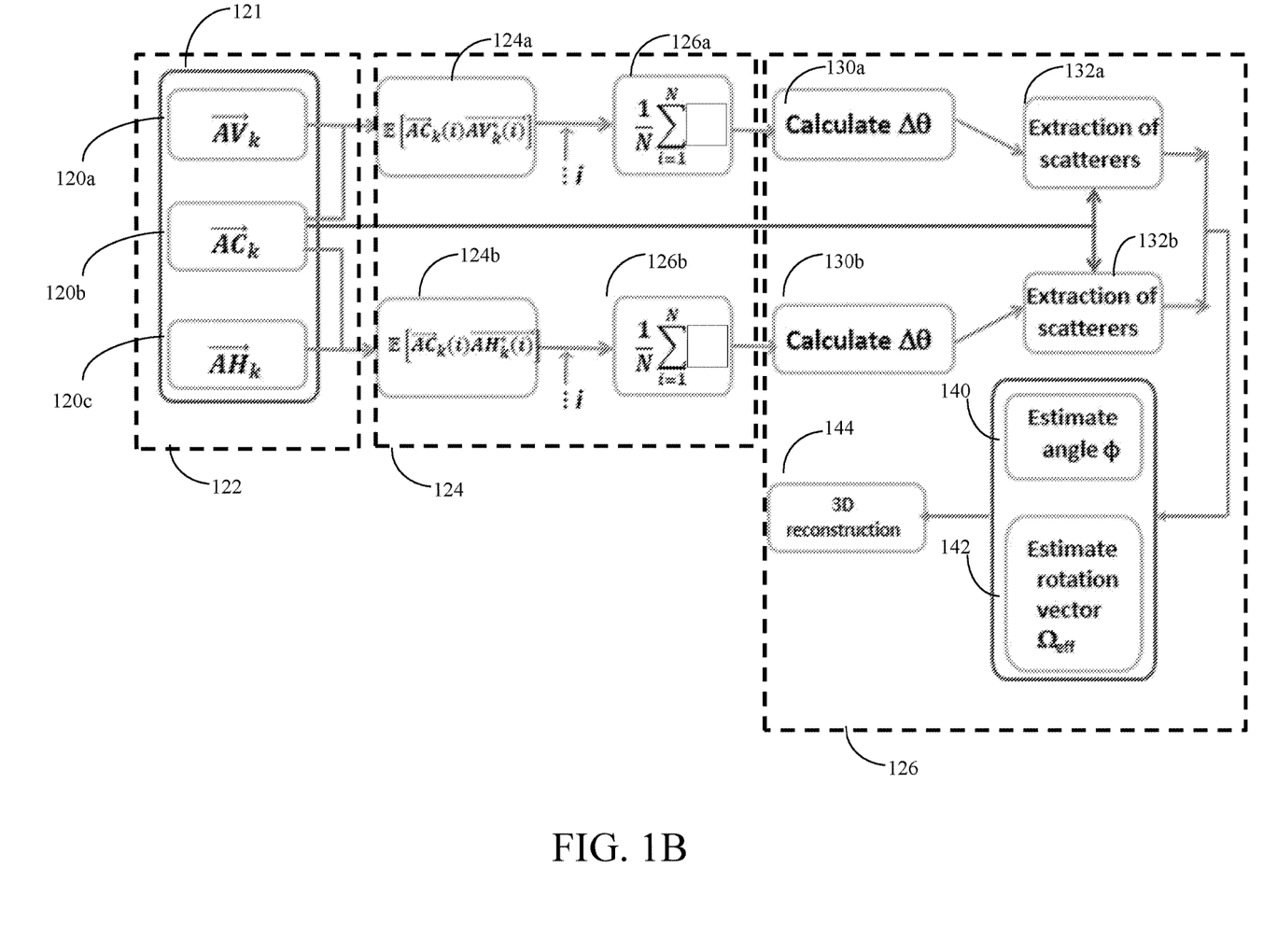
FIG. 1B is a block diagram showing an exemplary system for 3D imaging in accordance with an embodiment of the present disclosure.

FIG. 1B is a block diagram showing an exemplary system for 3D imaging in accordance with an embodiment of the present disclosure. FIG. 1B includes steps for an entropy based method of range alignment and range-doppler imaging 122, steps for spatio-sensor multilook processing for robust interferometric calculations 124, and steps for an estimation of scatterer heights 126. In an embodiment, a spatio-sensor multilook denoising procedure in accordance with an embodiment of the present disclosure deals with the practical aspect of noise in measurements.

In step 121, data from sensors 120 is received. In an embodiment, sensors 120 are elements chosen from a phased array. In an embodiment, the phased array comprises multiple elements, three elements are chosen at a time as a triplet. In FIG. 1B, the triplet is represented by sensors 120. In an embodiment, steps 124 and 126 are performed on the chosen set of triplets. Any number of sets of triplets can be chosen to perform steps 124 and 126 in accordance with embodiments of the present disclosure. For example, choosing to perform steps 124 and 126 on a larger number of triplets can lead to more robustness of height estimation. Choosing to perform steps 124 and 126 on a smaller number of triplets can give you a faster result. In an embodiment, the triplets in each set and the number of sets of triplets are chosen by a controller. In an embodiment, the triplets in each set and the number of sets of triplets are chosen by a user.

For example, in an embodiment, sensors 120a, 120b, and 120c each sense the same scatterer, but from a different location. In an embodiment, because of the different locations, there is a phase difference between data from each of sensors 120. In steps 124, an expectation operation (e.g., a product and a sum) is performed on a spatial window centered around a scatterer k. Step 124a performs this operation using data from sensors 120a and 120b for scatterer k. Step 124b performs this operation using data from sensors 120b and 120c for scatterer k. In steps 126, steps 124 are performed for each of the triplets of sensors 120 in the phased array (e.g., for each of the chosen sets of triplets). In steps 130, the phase differences $\Delta\theta$ (=$\delta\varphi_H$ or $\delta\varphi_V$) are calculated. In steps 132, the scatters are extracted (e.g., removed from the scene). In step 140, the angle 4) (e.g., the orientation angle of the target in a fixed axis with respect to the Z axis) is estimated. In step 142, the rotation vector $\Omega_{eff}$ is estimated (e.g., a vector normal to the imaging plane determined by the roll, pitch, and yaw of the target and the line of sight from the radar to the target).

2. 3D Imaging Using Radar Sensor

To develop a system that supports these capabilities, embodiments of the present disclosure include derivations of fundamental bounds on antenna placement. For 3D imaging, the height h associated with each point scatterer is computed (e.g., resolved in the range, cross-range dimensions). In the analysis here, we focus, without loss of generality, on height estimation of a single point scatterer.

In an embodiment, height measurements are facilitated by interferometric interactions between electromagnetic waves with respect to antennas separated by baseline distance L. This relationship can be stated as follows:

$$h = \frac{\lambda.\delta\varphi.R}{2\pi L} \qquad (1)$$

where h is the height of the point scatterer above the ground plane, $\lambda$ is the wavelength of the electromagnetic wave, R is the distance from the origin of the radar coordinate system to the scatterer, and $\delta\varphi$ is the phase difference between the electromagnetic waves arriving at two antenna elements separated by distance L.

Figure 2:
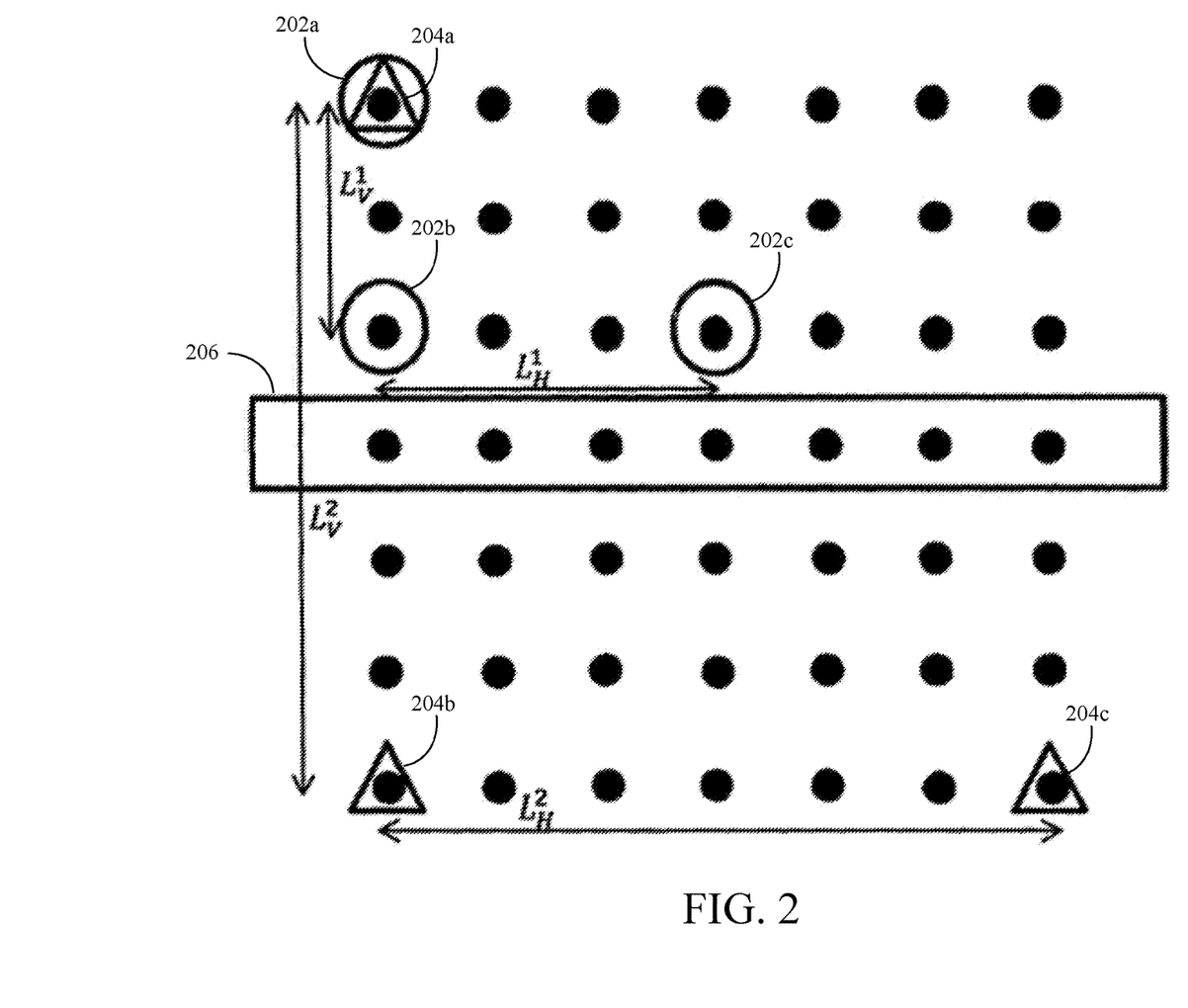
FIG. 2 is a conceptual layout of a 2D phased array in accordance with an embodiment of the present disclosure.

In an embodiment, an assumption made in (1) is that the imaging plane is fixed and parallel to the ground plane. This assumption is incorrect, however, for the general case of moving targets. For this case, (1) should be suitably modified to include the orientation $\phi$ of the imaging plane with respect to the ground plane reference. For the case in which the two antennas are separated vertically with respect to the ground plane (such as the antenna separated either by $L_V^1$ or $L_V^2$ in FIG. 2), Equation (1) is modified as follows:

$$h = \left(\frac{\lambda.R.\delta\varphi_V}{2\pi L_V} - y_{cr}\sin\phi\right) \cdot \frac{1}{\cos\phi} \qquad (2)$$

where $y_{cr}$ is the cross-range associated with the scatterer under consideration at the initial time, $L_V$ is the baseline separation between two vertically separated antennas, and $\delta\varphi_V$ is the corresponding phase difference. A similar relationship can be derived for the case of horizontally separated antennas (such as the antenna separated either by $L_H^1$ or $L_H^2$ in FIG. 2) that are at distance $L_H$ from each other:

$$h = \left(\frac{\lambda.R.\delta\varphi_H}{2\pi L_H} - y_{cr}\sin\phi\right) \cdot \frac{1}{\cos\phi} \qquad (3)$$

Combining (2) and (3) yields:

$$h = \frac{\lambda.R}{2\pi}\left(\frac{\delta\varphi_V}{2L_V}\cos\phi - \frac{\delta\varphi_H}{2L_H}\sin\phi\right) \qquad (4)$$

$$= \frac{\lambda.R}{2\pi L_{eff}}\left(\frac{\delta\varphi_V}{2L_V/L_{eff}}\cos\phi - \frac{\delta\varphi_H}{2L_H/L_{eff}}\sin\phi\right) \qquad (5)$$

$$= \frac{\lambda.R.\delta\varphi_{eff}}{2\pi L_{eff}} \qquad (6)$$

where $L_{eff} = \sqrt{L_H^2 + L_H^2}$ is the effective baseline length for the triplet antenna system; and $$\delta\varphi_{eff} = \left(\frac{\delta\varphi_V}{2L_V/L_{eff}}\cos\phi - \frac{\delta\varphi_H}{2L_H/L_{eff}}\sin\phi\right)$$

is the corresponding effective phase difference (in an embodiment, the angle φ can be estimated by using 3D-ISAR techniques).

Equation (6), which is the height estimate measured by a triplet antenna system, has a similar structure to (1) (which corresponds to a two-antenna system) except that the effective baseline length and phase difference estimates are used. An advantage of using a triplet antenna system (e.g., over a pair) is that in addition to allowing for improved height estimates (e.g., as explained in the next section), it allows for accurate estimation of orientation angle φ.

3. Exemplary Embodiments for 3D Imaging Using Multichannel Doppler and Interferometric Processing FIG. 2 is a conceptual layout of a 2D phased array in accordance with an embodiment of the present disclosure. FIG. 2 shows a general planar layout of M (e.g., ≥3) antennas on a circuit board with central portion 206. In an embodiment, the beam patterns associated with the antennas all cover the same region in space corresponding to the target of interest being imaged. Also, without loss of generality, in an embodiment our attention can be restricted to imaging a single point scatterer in the scene.

In an embodiment, any subset of three antennas can be used via Equation (6) to calculate height estimates associated with a scatterer in the scene. For example, two possible subsets having different horizontal and vertical baseline lengths are shown in FIG. 2, where sensors in the two groups are circumscribed by circles 202 and triangles 204, respectively. In an embodiment, the choice of the baseline pairs can be dictated by various engineering design considerations. There are a combinatorically high number of possible designs based on which set of sensor triplets is chosen to perform the height estimation.

In an embodiment, one fundamental constraint stems from the fact that the phase difference calculations for each scatterer are periodic functions of 2π. From Equation (1) it follows that the height measurements are unambiguous if:

$$|\delta\varphi| = \left|\frac{2\pi}{\lambda} \cdot \frac{hL}{R}\right| < \pi \qquad (7)$$

This places an upper bound on the baseline separation between sensors:

$$L \leq \left|\frac{\lambda R}{2h}\right| \qquad (8)$$

In an embodiment, another fundamental constraint on the selection of baseline pairs stems from the degradation of image quality due to phase noise. Specifically, the following lower bound constraint on the baseline distance can be given by:

$$L \geq \frac{\Delta_h}{\sigma_h}\sqrt{\left(\frac{\lambda}{2\pi}\cdot\Delta\varphi_h\right)^2\sigma_R^2 + \sigma_L^2 + \left(\frac{\lambda R}{2\pi}\right)^2\frac{(\delta\varphi^q)^2}{12}} \qquad (9)$$

In Equation (9), $\Delta_h$ is the quantization level of the phase difference $\delta\varphi^q$, and $\sigma_h$ is a design parameter specifying the maximum acceptable error for the height estimate. In addition to the fundamental constraints of Equations (8) and (9) and the practical constraints of phased array radar design, in an embodiment, a key issue for 3D ISAR imaging is sensor noise, especially at MMW and automotive frequencies where transmitter power is low and receiver noise figure is typically poor. In an embodiment, pointwise "single look" height estimates such as those in Equation (6) are particularly sensitive to sensor noise—much more so than the formation of a corresponding 2D ISAR image—because the underlying interferometric calculations are at the mercy of pointwise perturbations in phase space. Multilook processing, however, is widely recognized in the SAR imaging community as an effective technique to ameliorate the effects of phase noise.

Embodiments of the present disclosure therefore adapt multilook processing structures to 3D ISAR processing to significantly improve the accuracy of height estimation. In an embodiment, the multilook processing statistic computed for scatterer k can be given as follows:

$$s_k = \frac{1}{N}\sum_{i=1}^{N}\mathbb{E}[y_1^k(i)y_2^{k*}(i)] \qquad (10)$$

In Equation (10), N is the number of looks, and $y_1^k$ and $y_1^k$ are a pair of complex one-look image segments corresponding to a $M_1 \times M_2$ window centered at scatterer k. In an embodiment, the intuitively reasonable assumptions of ergodicity and stationarity of the underlying statistics, which justify Equation (10), are borne out by the results in the next section. Using the resulting statistic $s_k$, relevant phase differences along the horizontal (or vertical) baselines can be extracted, which in turn can be used to estimate the scatterer height. In an embodiment, the spatial average operation denoted by the expectation operator $\mathbb{E}$ allows for effective utilization of both spatial and multi-sensor degrees of freedom in that the averaging is performed along the spatial and sensor dimensions.

Figure 3A:
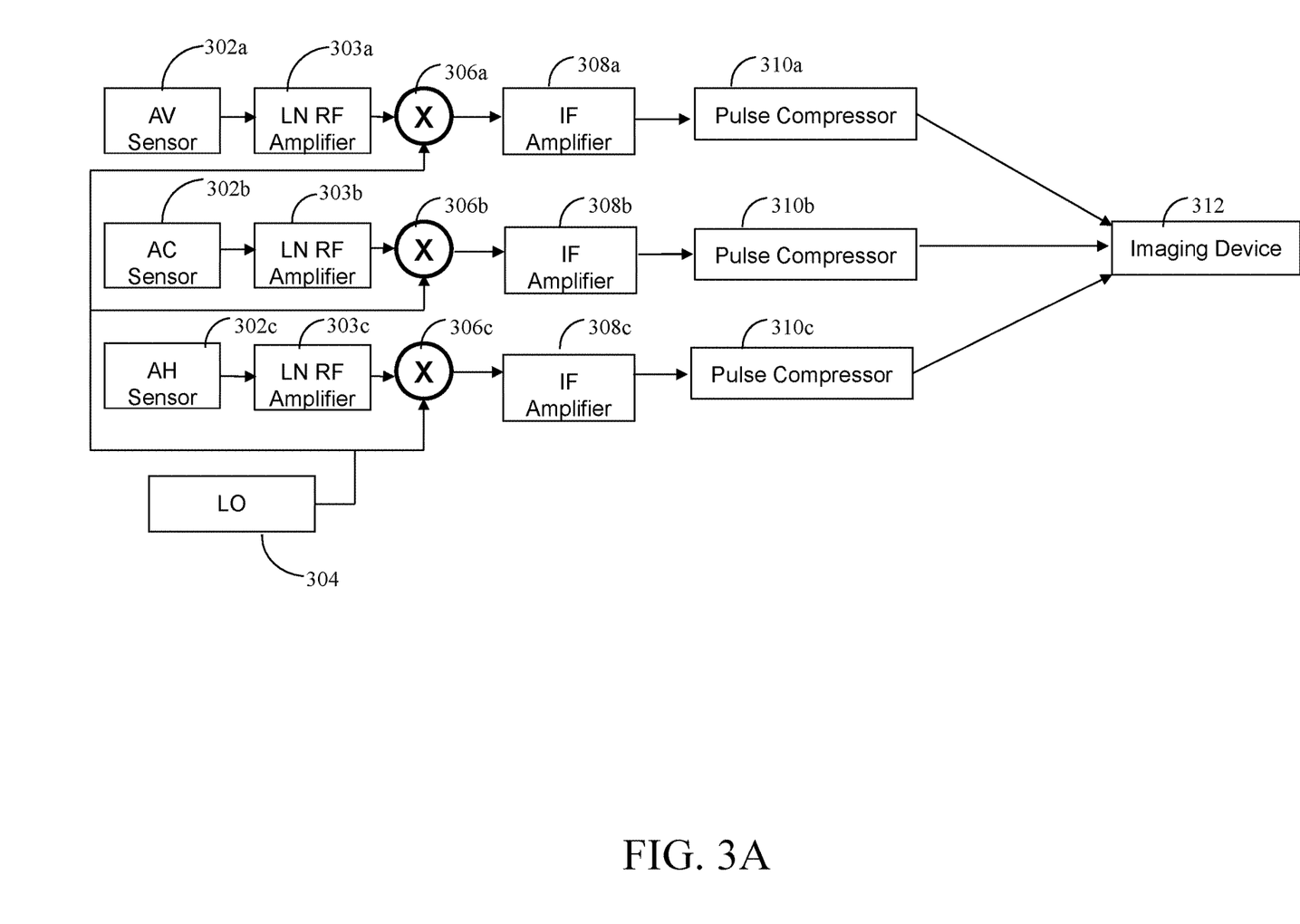
FIG. 3A is a diagram of an exemplary system for multi-look 3D imaging in accordance with an embodiment of the present disclosure.

FIG. 3A is a diagram of an exemplary system for multi-look 3D imaging in accordance with an embodiment of the present disclosure. As discussed above, an antenna array in accordance with an embodiment of the present disclosure can have multiple sensors (e.g., antenna elements). For example, in an embodiment, sensors 302 are sensors of a millimeter-wave (MMW) radar, and the MMW radar is configured to send a MMW radar signal and to receive MMW radar returns corresponding to the MMW radar signal. In an embodiment, each sensor can be coupled to respective processing circuitry. For example, in an embodiment, sensors 302 in FIG. 3A are coupled to respective low noise (LN) radio frequency (RF) amplifiers 303. In an embodiment, amplifiers 303 are mixed with a signal from a local oscillator (LO) 304 by respective mixers 306. In FIG. 3A, the mixed signal output from mixers 206 is sent to respective intermediate frequency (IF) amplifiers 308 and then to respective pulse compressors 310. In an embodiment, pulse compressors 310 output respective filtered signals to an imaging device 312.

Figure 3B:
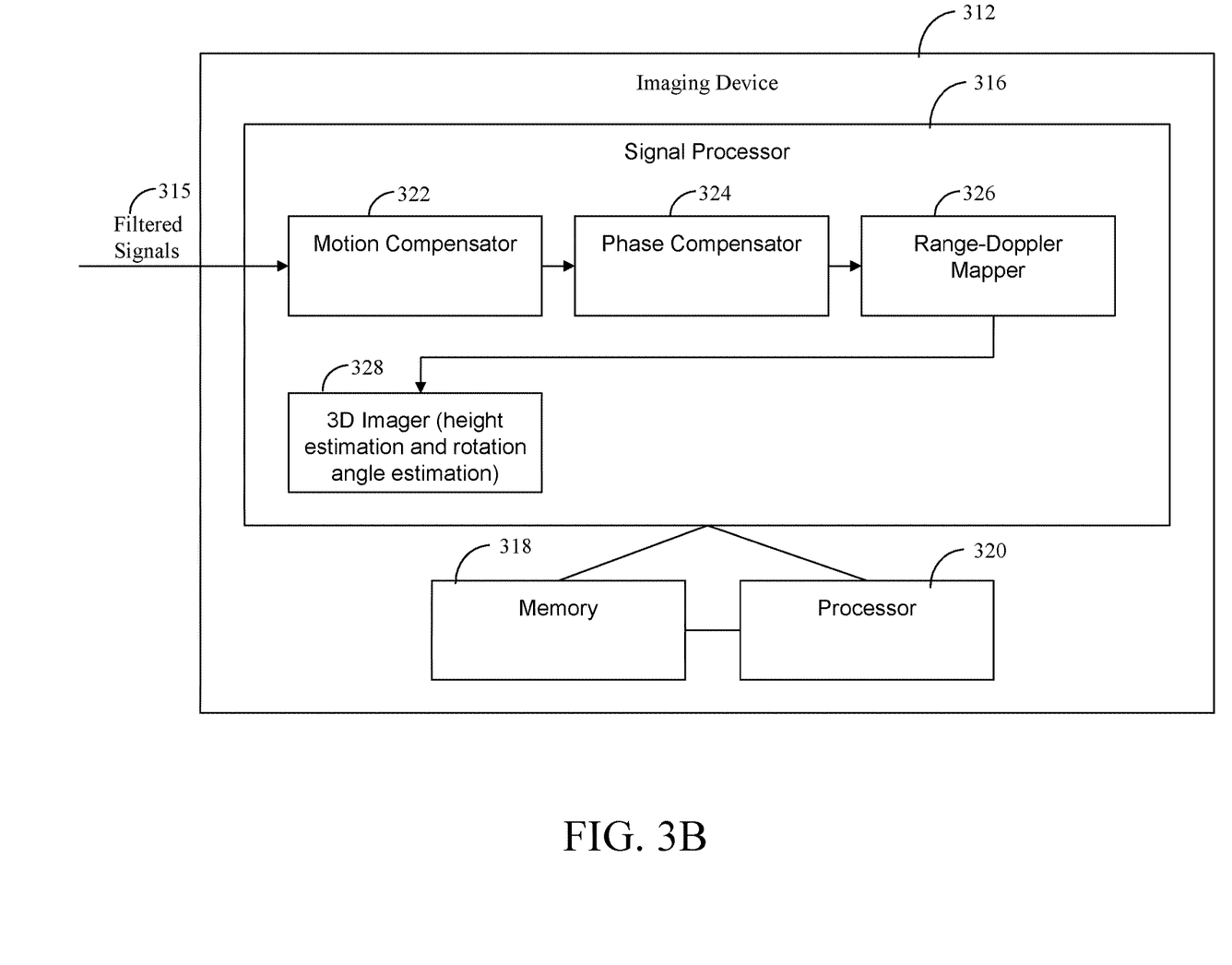
FIG. 3B is a diagram of an exemplary imaging device for multilook 3D imaging in accordance with an embodiment of the present disclosure.

FIG. 3B is a diagram of an exemplary imaging device 312 for multilook 3D imaging in accordance with an embodiment of the present disclosure. In an embodiment, imaging device 312 comprises signal processor 316, memory 318, and processor 320. In FIG. 3B, motion compensator 322 of signal processor 316 receives filtered signals 315 from pulse compressors 310. For example, in an embodiment, motion compensator 322 compensates for translational motion in the scene. In an embodiment, motion compensator 322 outputs the motion compensated signal to phase compensator 324. In an embodiment, phase compensator 322 is configured to remove phase drifts in the plurality of filtered signals and to render a plurality of linear phase functions in each range cell of a plurality of range cells. In an embodiment, phase compensator 324 compensates for phase differences smaller corresponding to motion within a range bin and outputs the phase compensated signal to range-Doppler mapper 326. In an embodiment, range-Doppler mapper 326 forms a 2D scene, where one axis is the range and a second axis is proportional to the Doppler, so the Doppler is mapped to the motion of the target. In FIG. 3B, range-Doppler mapper 326 outputs a signal to 3D imager 328. In an embodiment, 3D imager 328 creates a 3D image based on 2D scenes from range-Doppler mapper 326. In an embodiment, range-Doppler mapper 326 generates a plurality of 2D images. In an embodiment, a first axis of each 2D image in is aligned with range, and a second axis of each 2D image is aligned with Doppler.

Elements of FIGS. 3A and 3B can be implemented using hardware, software, and/or a combination of hardware and software in accordance with embodiments of the present disclosure. For example, in an embodiment, signal processor 316 is a DSP, and operations performed by signal processor 316 are performed using hardware. In an embodiment, signal processor 316 is implemented using hardware (e.g., using a chip). Elements of FIGS. 3A and 3B can be implemented using a single device or multiple devices. Further, in an embodiment, elements of FIGS. 3A and 3B can be implemented into a host device (e.g., into a radar, such as MMW radar 508 in FIGS. 5A and 5B and/or into a radar controller, such as controller 506 in FIGS. 5A and 5B).

Figure 4:
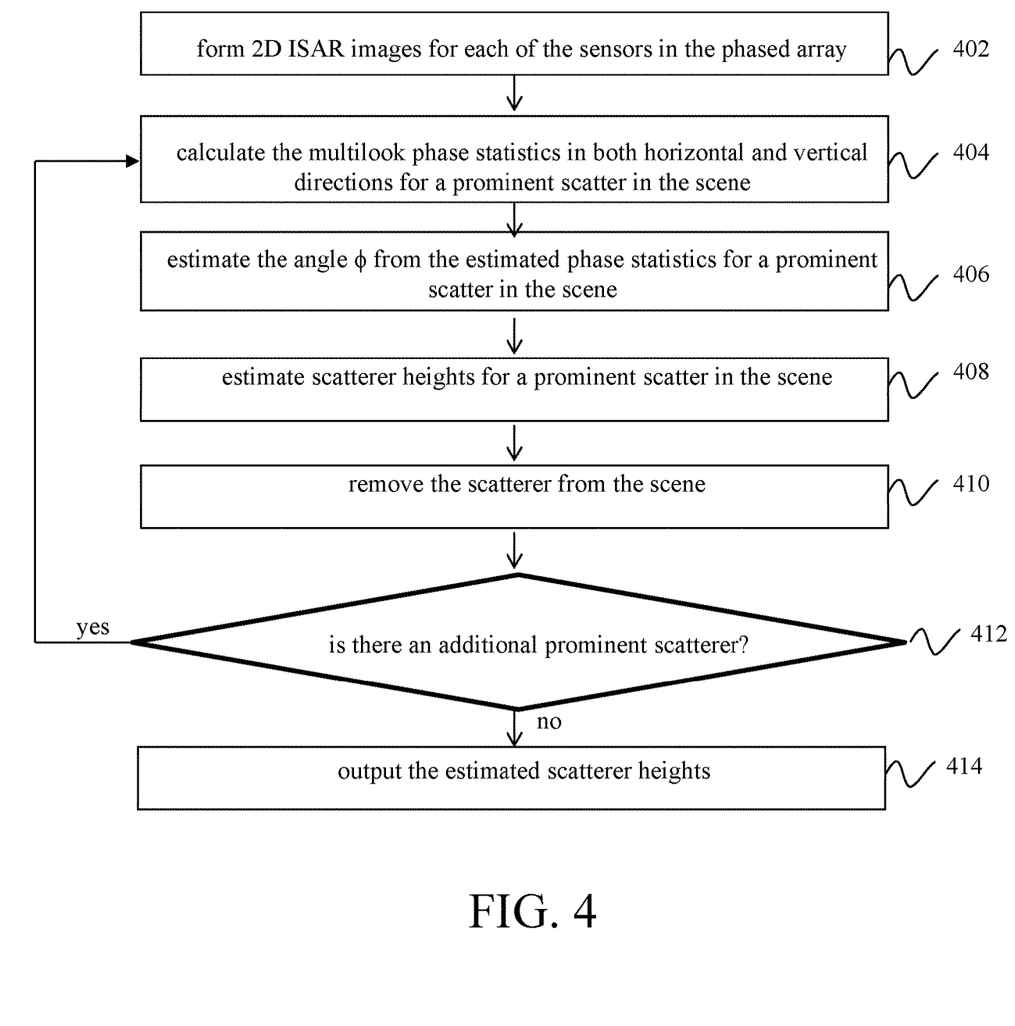
FIG. 4 is a flowchart of a diagram for an exemplary multilook 3D imaging method in accordance with an embodiment of the present disclosure.

FIG. 4 is a flowchart of a diagram for an exemplary multilook 3D imaging method in accordance with an embodiment of the present disclosure. In step 402, 2D ISAR images are formed for each of the sensors in the phased array. For example, in an embodiment, range-Doppler mapper 326 forms the 2D ISAR images for sensors in the phased array. In an embodiment, to form the 2D ISAR images, entropy based range alignment, phase compensation, and range-Doppler processing can be used by range-Doppler mapper 326. For example, these 2D ISAR images can be formed to isolate scatterers so that the brightest scatterers can be selected.

In an embodiment, steps 404-410 are performed for each scatterer in the scene. For example, in an embodiment, the number of scatters in the scene can be chosen (e.g., by a user and/or a controller). In an embodiment, height estimates will be less accurate for weak scatterers and more accurate for strong scatterers. In an embodiment, be choice of the number of scatterers can be chosen (e.g., by a controller or a user) to maximize accuracy; choosing too many weak scatterers can introduce errors into the calculations of heights for weak scatterers (e.g., leading to a blurrier image). For example, in an embodiment, scatterers with the highest magnitude in the scene are chosen (e.g., because they have the highest intensity of brightness in the scene).

In step 404, multilook phase statistics are calculated in both horizontal and vertical directions for a prominent scatterer in the scene. For example, in an embodiment, 3D imager 328 calculates the multilook phase statistics. In step 406, the angle ϕ is estimated from the estimated statistic for a prominent scatterer in the scene. For example, in an embodiment, 3D imager 328 calculates the angle ϕ. In step 408, scatterer heights are estimated for a prominent scatterer in the scene. For example, in an embodiment, 3D imager 328 estimates the scatterer height. In step 410, the scatterer is removed from the scene (e.g., so the next scatterer can be processed). For example, in an embodiment, 3D imager 328 removes the scatterer. In step 412, it is determined whether there are additional prominent scatterers in the scene. If there are, the method proceeds back to step 404. If there are not, the method proceeds to step 414, where the estimated scatterer heights are output. In an embodiment, the estimated scatterer heights and/or the estimated angles ϕ can be used to generate a 3D image (e.g., using 3D imager 328).

4. Exemplary MMW Radar Embodiments

Figure 5A:
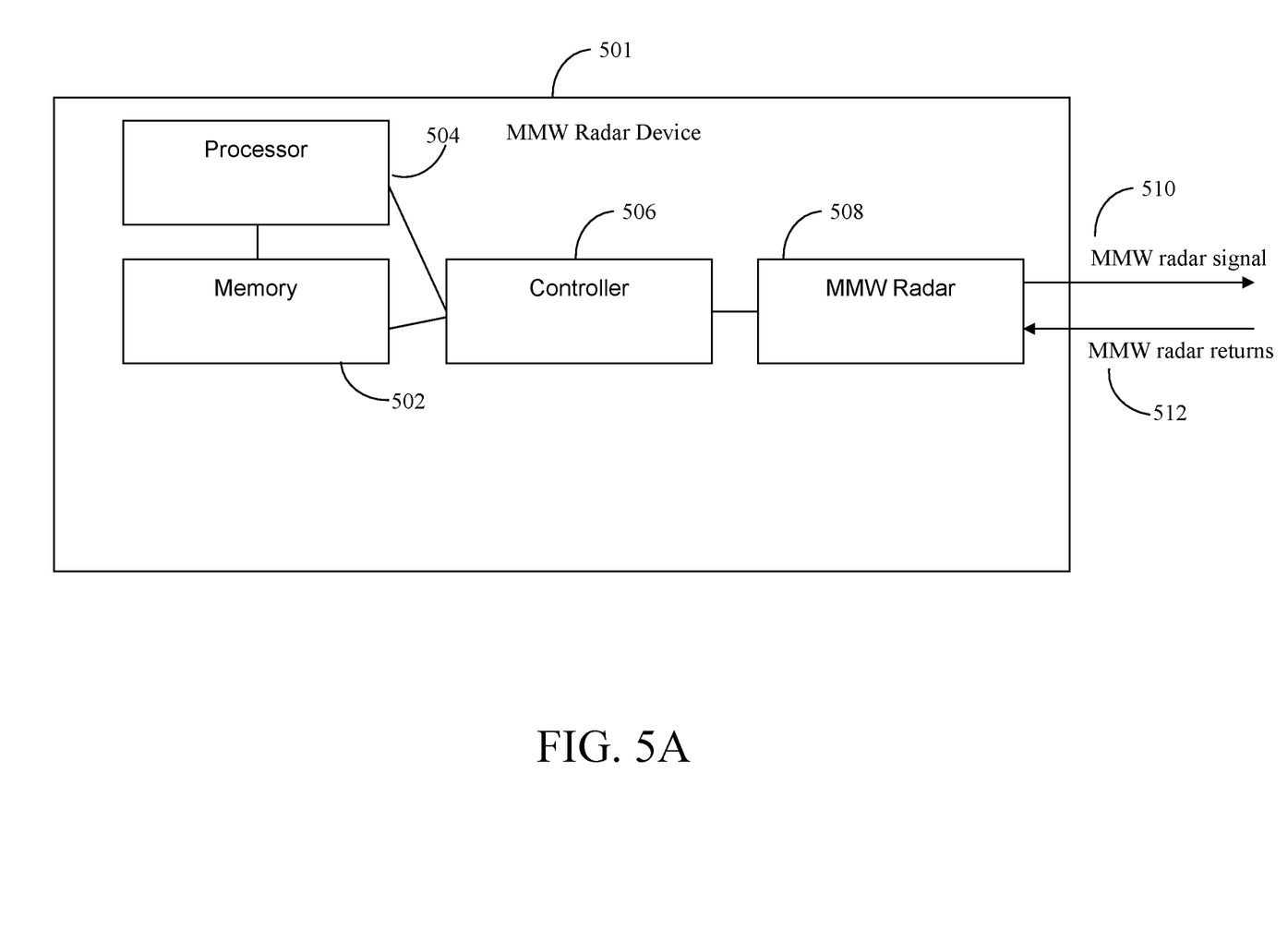
FIG. 5A is a diagram of an exemplary millimeter-wave (MMW) radar device in accordance with an embodiment of the present disclosure.

In an embodiment, the methods for 3D imaging described in this disclosure can be performed using a MMW radar (and/or a controller coupled to the MMW radar). FIG. 5A is a diagram of an exemplary MMW radar device 501 in accordance with an embodiment of the present disclosure. In an embodiment, MMW radar device 501 includes a processor 504, a memory 502, a controller 506, and a MMW radar 508. In an embodiment, MMW radar 508 comprises a plurality of receive sensors. In an embodiment, MMW radar 508 can send MMW radar output signals 510 and can receive MMW radar returns 1012 corresponding to the sent MMW radar signals 510. In an embodiment, controller 506 can determine the validity of the MMW radar returns 512 and can perform operations described in this disclosure. For example, in an embodiment, controller 506 can perform the operations described in FIG. 4 and/or FIG. 1B. In an embodiment, MMW radar 508 comprises the elements of FIGS. 3A and 3B and/or FIG. 2.

Figure 5B:
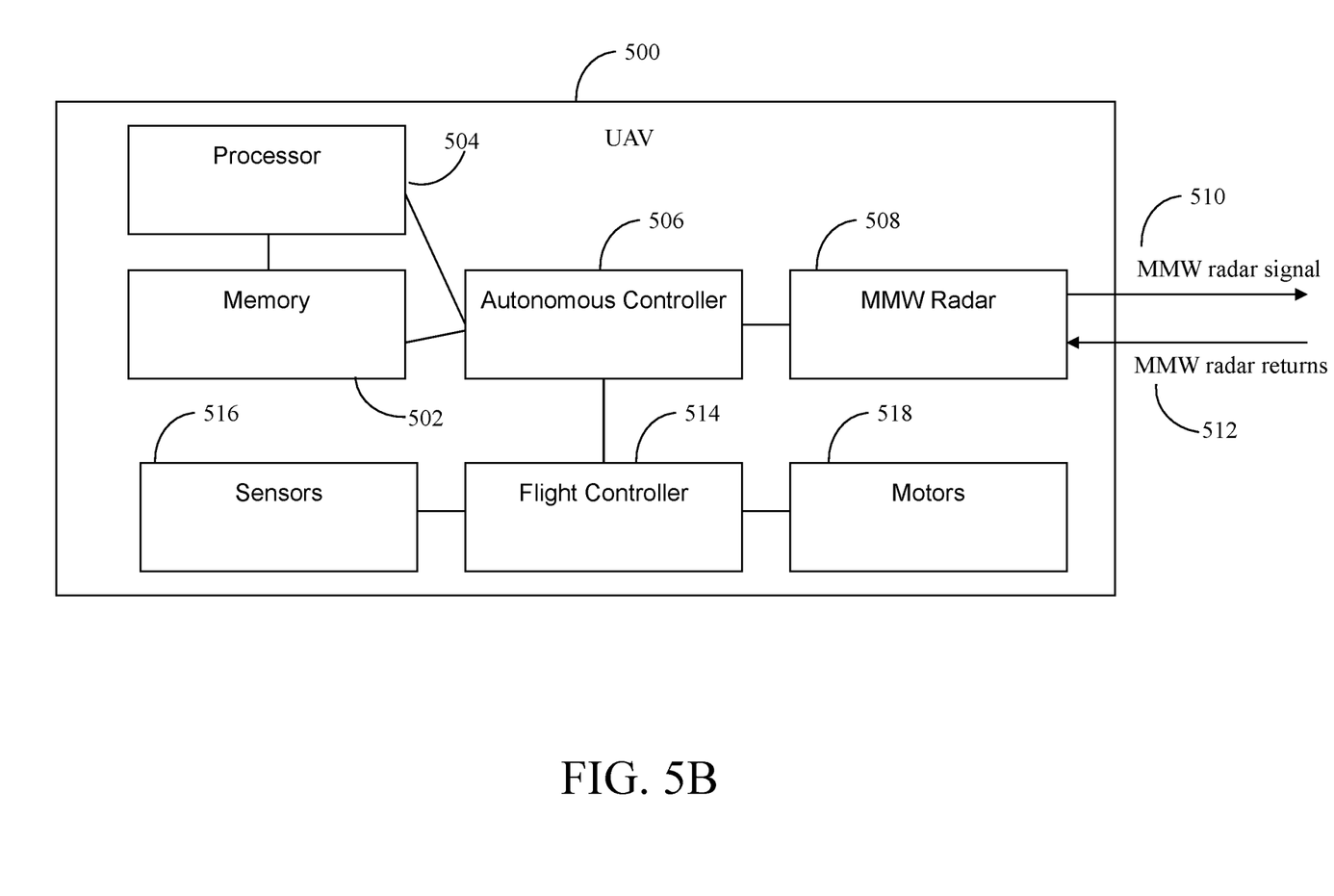
FIG. 5B is a diagram of an exemplary UAV in accordance with an embodiment of the present disclosure.

FIG. 5B is a diagram of an exemplary UAV 500 in accordance with an embodiment of the present disclosure. In an embodiment, UAV 500 includes a processor 504, a memory 502, an autonomous controller 506, a MMW radar 508, a flight controller 514, additional onboard sensors 516, and motors (e.g., to control UAV 500) 518. In an embodiment, MMW radar 508 comprises a plurality of receive sensors. In an embodiment, controller 506 of UAV 500 is an autonomous controller. In an embodiment, autonomous controller 506 of UAV 500 can determine the validity of the MMW radar returns 512 and can perform operations described in this disclosure. For example, in an embodiment, autonomous controller 506 of UAV 500 can perform the operations described in FIG. 4 and/or FIG. 1B. In an embodiment, MMW radar 508 comprises the elements of FIGS. 3A and 3B and/or FIG. 2.

It should be understood that MMW radar device 501 and UAV 500 can include additional components not shown in FIGS. 5A and 5B (e.g., a power supply such as a battery, an antenna, propellers, etc.) Further, it should be understood that MMW radar device 501 and UAV 500 can be implemented using hardware, software and/or a combination of hardware and software in accordance with embodiments of the present disclosure. Components of MMW radar device 501 and UAV 500 (e.g., controller 506 and/or MMW radar 508) can be implemented using a single device or multiple devices in accordance with embodiments of the present disclosure and can also be implemented using hardware, software and/or a combination of hardware and software.

5. Exemplary Advantages

Embodiments of the present disclosure have several advantages when compared to prior techniques. For example, unlike previous approaches in motion compensation, embodiments of the present disclosure can take advantage of the full aperture of the phased array. Formation of an accurate motion compensated 3D image of the scene of interest can enable the extraction of reliable features for detected object discrimination applications.

Embodiments of the present disclosure provide interferometric processing for height estimation that incorporates a multi-look denoising procedure that can exploit both the spatial structure of the ISAR imagery and multi-phase-center structure of the processing array. Embodiments of the present disclosure provide improved height estimation performance under sensor noise. Embodiments of the present disclosure can result in improved practical performance of 3D imaging under realistic sensing conditions. In terms of range of applications, embodiments of the present disclosure can utilize fundamental processing structures which can be invoked whenever 3D ISAR imaging is implemented on phase arrays.

6. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A millimeter-wave (MMW) radar device, comprising:
a MMW radar, comprising a plurality of sensors; and
a controller, coupled to the MMW radar, wherein the controller is configured to:
form a plurality of two-dimensional (2D) images of an object sensed by the plurality of sensors,
select, based on the plurality of 2D images, a plurality of scatterers,
estimate, based on the plurality of scatterers, respective scatterer heights for each selected scatterer in the plurality of scatterers,
calculate multilook phase statistics for each selected scatterer in the plurality of scatterers,
estimate respective angles for effective rotation vectors of the object for each selected scatterer in the plurality of scatterers based on the multilook phase statistics, and
generate a three-dimensional (3D) image based on the estimated angles and the estimated scatterer heights.

2. The MMW radar device of claim 1, wherein the MMW radar device is an unmanned aerial vehicle (UAV).

3. The MMW radar device of claim 1, wherein the controller is configured to select the plurality of scatterers based on respective intensities of the plurality of scatterers in the 2D images.

4. The MMW radar device of claim 1, wherein the controller is further configured to estimate respective orientation angles and effective rotation vectors of an imaging plane comprising the plurality of scatterers.

5. The MMW radar device of claim 1, further comprising:
an imaging device coupled to the plurality of sensors;
a plurality of low noise (LN) amplifiers coupled to respective outputs of respective sensors in the plurality of sensors;

a plurality of mixers coupled to respective outputs of respective LN amplifiers in the plurality of LN amplifiers;

a plurality of intermediate frequency (IF) amplifiers coupled to respective outputs of respective mixers in the plurality of mixers; and a plurality of pulse compressors coupled to respective outputs of the respective IF amplifiers in the plurality of IF amplifiers and to the imaging device, wherein the imaging device is configured to receive a plurality of filtered signals from the plurality of pulse compressors.

6. The MMW radar device of claim 1, further comprising an imaging device coupled to the plurality of sensors, wherein the imaging device comprises a range-Doppler mapper configured to generate the plurality of 2D images, wherein a first axis of each 2D image in the plurality of 2D images is aligned with range, and wherein a second axis of each 2D image in the plurality of 2D images is aligned with Doppler.

7. A millimeter-wave (MMW) radar device, comprising:
a plurality of sensors; and
a imaging device, coupled to the plurality of sensors, wherein the imaging device is configured to:
form a plurality of two-dimensional (2D) images of an object sensed by the plurality of sensors,
select, based on the plurality of 2D images, a plurality of scatterers,
calculate multilook phase statistics for each selected scatterer in the plurality of scatterers,
estimate, based on the multilook phase statistics, respective angles for effective rotation vectors of the object for each selected scatterer in the plurality of scatterers,
estimate, based on the multilook phase statistics, respective scatterer heights for each selected scatterer in the plurality of scatterers, and
generate a three-dimensional (3D) image based on the estimated angles and scatterer heights.

8. The MMW radar device of claim 7, further comprising:
a plurality of low noise (LN) amplifiers coupled to respective outputs of respective sensors in the plurality of sensors;
a plurality of mixers coupled to respective outputs of respective LN amplifiers in the plurality of LN amplifiers;
a plurality of intermediate frequency (IF) amplifiers coupled to respective outputs of respective mixers in the plurality of mixers; and
a plurality of pulse compressors coupled to respective outputs of the respective IF amplifiers in the plurality of IF amplifiers and to the imaging device, wherein the imaging device is configured to receive a plurality of filtered signals from the plurality of pulse compressors.

9. The MMW radar device of claim 7, wherein the imaging device further comprises a motion compensator, wherein the motion compensator is configured to compensate for translational motion in the 2D images.

10. The MMW radar device of claim 7, wherein the imaging device further comprises a phase compensator configured to remove phase drifts in the plurality of filtered signals and to render a plurality of linear phase functions in each range cell of a plurality of range cells.

11. The MMW radar device of claim 7, wherein the imaging device further comprises a range-Doppler mapper configured to generate the plurality of 2D images, wherein a first axis of each 2D image in the plurality of 2D images is aligned with range, and wherein a second axis of each 2D image in the plurality of 2D images is aligned with Doppler.

12. The MMW radar device of claim 7, wherein the imaging device further comprises a 3D imager configured to generate the 3D image.

13. The MMW radar device of claim 7, wherein the MMW radar device is an unmanned aerial vehicle (UAV).

14. The MMW radar device of claim 7, wherein the imaging device is configured to select the plurality of scatterers based on respective intensities of the plurality of scatterers in the 2D images.

15. A method, comprising:
forming, using a millimeter-wave (MMW) radar device, a plurality of two-dimensional (2D) images of an object sensed by a plurality of sensors of the MMW radar device;
selecting, using the MMW radar device, a plurality of scatterers based on the plurality of 2D images;
estimating, using the MMW radar device, respective scatterer heights for each selected scatterer in the plurality of scatterers;
calculating multilook phase statistics for each selected scatterer in the plurality of scatterers;
estimating respective angles for effective rotation vectors of the object for each selected scatterer in the plurality of scatterers based on the multilook phase statistics; and
generating, using the MMW radar device, a three-dimensional (3D) image based on the estimated angles and the estimated scatterer heights.

16. The method of claim 15, wherein estimating the respective scatterer heights further comprises estimating the respective scatterer heights for each selected scatterer in the plurality of scatterers based on the multilook phase statistics.

17. The method of claim 15, further comprising selecting three sensors in the plurality of sensors as a triplet, wherein the three sensors in the triplet are each configured to sense a first scatter in the plurality of scatterers from three different respective locations.

18. The method of claim 17, further comprising:
performing, using a first sensor in the triplet and a second sensor in the triplet, a first expectation operation on a vector formed by taking a first complex product of two spatial windows centered around the first scatterer; and
performing, using the second sensor and a third sensor in the triplet, a second expectation operation on a vector formed by taking a second complex product of the two spatial windows.

19. The method of claim 18, further comprising selecting a plurality of groups of three sensors in the plurality of sensors as a plurality of triplets, wherein each respective group of three sensors in the plurality of groups of three sensors is configured to sense different respective scatters in the plurality of scatterers.

20. The method of claim 19, further comprising performing respective expectation operations on respective spatial windows for each of the triplets in the plurality of triplets.

* * * * *